United States Patent
Johnson et al.

(10) Patent No.: US 10,710,391 B1
(45) Date of Patent: Jul. 14, 2020

(54) METHOD FOR DETECTING THE PHYSICAL CHARACTERISTICS OF A PHYSICAL CREDENTIAL IN 3D SPACE FOR ID AUTHENTICITY

(71) Applicant: Capital One Services, LLC, McLean, VA (US)

(72) Inventors: Clayton Johnson, Edgewood, MD (US); Daniel Tesser, McLean, VA (US); Luis de la Rosa, Falls Church, VA (US); Jeffrey Wieker, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/656,748

(22) Filed: Oct. 18, 2019

(51) Int. Cl.
| | | |
|---|---|---|
| *B42D 25/309* | (2014.01) | |
| *B42D 25/23* | (2014.01) | |
| *G06F 21/36* | (2013.01) | |
| *G06K 9/00* | (2006.01) | |
| *B42D 25/333* | (2014.01) | |

(52) U.S. Cl.
CPC ........... *B42D 25/309* (2014.10); *B42D 25/23* (2014.10); *B42D 25/333* (2014.10); *G06F 21/36* (2013.01); *G06K 9/00442* (2013.01)

(58) Field of Classification Search
CPC .................................................. B42D 25/309
USPC ....................................................... 235/380
See application file for complete search history.

(56) References Cited

U.S. PATENT DOCUMENTS

| | | |
|---|---|---|
| 7,206,431 B2 | 4/2007 | Schuessler |
| 8,171,567 B1 | 5/2012 | Fraser et al. |
| 9,811,671 B1 | 11/2017 | Durst et al. |
| 2002/0020741 A1 | 2/2002 | Sakaguchi |
| 2003/0086591 A1 | 5/2003 | Simon |
| 2007/0164558 A1* | 7/2007 | Wicker .............. H04N 1/00838 283/94 |
| 2012/0212789 A1* | 8/2012 | Shirakura ............ G03H 1/0011 359/2 |
| 2013/0154250 A1* | 6/2013 | Dunn ..................... B42D 25/41 283/67 |
| 2014/0338907 A1* | 11/2014 | Reddy ..................... E21B 43/25 166/282 |
| 2016/0378061 A1* | 12/2016 | Reinhardt .............. G07D 7/121 382/154 |

(Continued)

*Primary Examiner* — Allyson N Trail
(74) *Attorney, Agent, or Firm* — Banner & Witcoff, Ltd.

(57) ABSTRACT

Aspects described herein may provide detection of a physical characteristic of a credential, thereby allowing for authentication of the credential. According to some aspects, these and other benefits may be achieved by detecting the physical characteristic with the credential in two or more orientations. A first image of a credential in a first orientation and a second image of the credential in a second orientation may be received. An optical characteristic of a secure feature of the credential may be determined based on light reflected from the secure feature in both the first image and the second image. An expected optical characteristic of the secure feature may be determined based on known properties of the secure feature. A determination as to whether the credential is authentic may be based how a comparison of the determined optical characteristic of the secure feature to the expected optical characteristic of the secure feature.

19 Claims, 4 Drawing Sheets

(56) References Cited

U.S. PATENT DOCUMENTS

| | | |
|---|---|---|
| 2017/0039684 A1 | 2/2017 | Bocharov et al. |
| 2017/0185881 A1* | 6/2017 | Syrjanen ................ G06K 19/02 |
| 2018/0186164 A1* | 7/2018 | Wu ...................... B42D 25/309 |
| 2018/0247039 A1* | 8/2018 | Yoon ........................ G06F 21/32 |
| 2019/0308432 A1* | 10/2019 | Van Den Berg ....... B42D 25/29 |

\* cited by examiner

METHOD FOR DETECTING THE PHYSICAL CHARACTERISTICS OF A PHYSICAL CREDENTIAL IN 3D SPACE FOR ID AUTHENTICITY

FIELD OF USE

Aspects of the disclosure relate generally to authentication of a physical credential. More specifically, aspects of the disclosure may provide improved detection of a physical characteristic of a physical credential to enhance a determination of authenticity of the physical credential.

BACKGROUND

Physical credentials, such as identification documents or cards, often require authentication. To perform authentication, many conventional techniques verify a feature included on the physical credential such as a holographic feature. Many of these conventional authentication techniques rely on a single image of the physical credential. Using only a single image of the physical credential renders these conventional techniques susceptible to fraud. For example, a fraudulent document containing a high-quality photocopy of a holographic feature may be determined to be authentic by these conventional techniques when a single image of the holographic feature is used for verification. As a result, these authentication techniques may be easily deceived, leading to unreliable detection of inauthentic physical credentials.

Aspects described herein may address these and other problems, and generally improve the reliability of authenticating a physical credential by detecting physical properties of the physical credential in a more accurate and reliable manner.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide detection of a physical characteristic of a physical credential, thereby allowing for authentication of the physical credential. According to some aspects, these and other benefits may be achieved by detecting the physical characteristic based on two or more orientations of the physical credential. More particularly, some aspects described herein may provide a computer-implemented method for determining an authenticity of a physical credential. The method may include receiving a first image of a credential in a first orientation and receiving a second image of the credential in a second, different orientation. A type of the credential may be determined based on at least one of the first image and the second image. A secure feature of the credential may be determined based on the determined type of the credential. An optical characteristic of the secure feature may be determined based on light reflected from the secure feature in both the first image and the second image. An expected optical characteristic of the secure feature may be determined based on known properties of the secure feature, the first orientation, and the second orientation. The credential may be determined to be authentic when the determined optical characteristic of the secure feature matches the expected optical characteristic of the secure feature. The credential may be determined to be inauthentic when the determined optical characteristic of the secure feature fails to match the expected optical characteristic of the secure feature.

Some aspects described herein may provide a system for determining an authenticity of a physical credential. The system may include a database configured to store known physical characteristics of a secure feature of a credential. The system may include one or more processors. The system may include memory storing instructions that, when executed by the one or more processors, cause the system to perform the following operations: receive a video sequence of the credential in two or more orientations; determine a type of the credential based on the video sequence; determine the secure feature of the credential based on the determined type of the credential; determine a value indicating a physical characteristic of the secure feature based on light reflected from the secure feature in the video sequence; determine an expected value indicating the physical characteristic of the secure feature based on the known physical characteristics of the secure feature, a light level of an environment of the credential, and the two or more orientations; compare the determined value and the determined expected value; and determine the credential is authentic when the determined value is within a predetermined range of the determined expected value and/or determine the credential is inauthentic when the determined value is outside of the predetermined range of the determined expected value.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for verifying an authenticity of a physical credential. Two or more images of the physical credential may be received. Light reflected from the physical credential may vary between the two or more images of the physical credential. The light reflected from the physical credential in the two or more images enables a physical characteristic of the physical credential to be determined such as an optical characteristic of a secure feature of the physical credential. The determined physical characteristic of the physical credential is compared to an expected physical characteristic of the physical credential based on known physical properties of the physical credential. The physical credential is determined to be authentic if the determined physical characteristic matches the expected physical characteristic. As discussed further herein, determining a physical characteristic of the physical credential using two or more images of the physical credential such that light reflects from the physical credential differently in each of the two or more images improves detection of inauthentic physical credentials.

Before discussing these concepts in greater detail, however, several examples of a computing device that may be used in implementing and/or otherwise providing various aspects of the disclosure will first be discussed with respect to FIG. 1.

Figure 1:
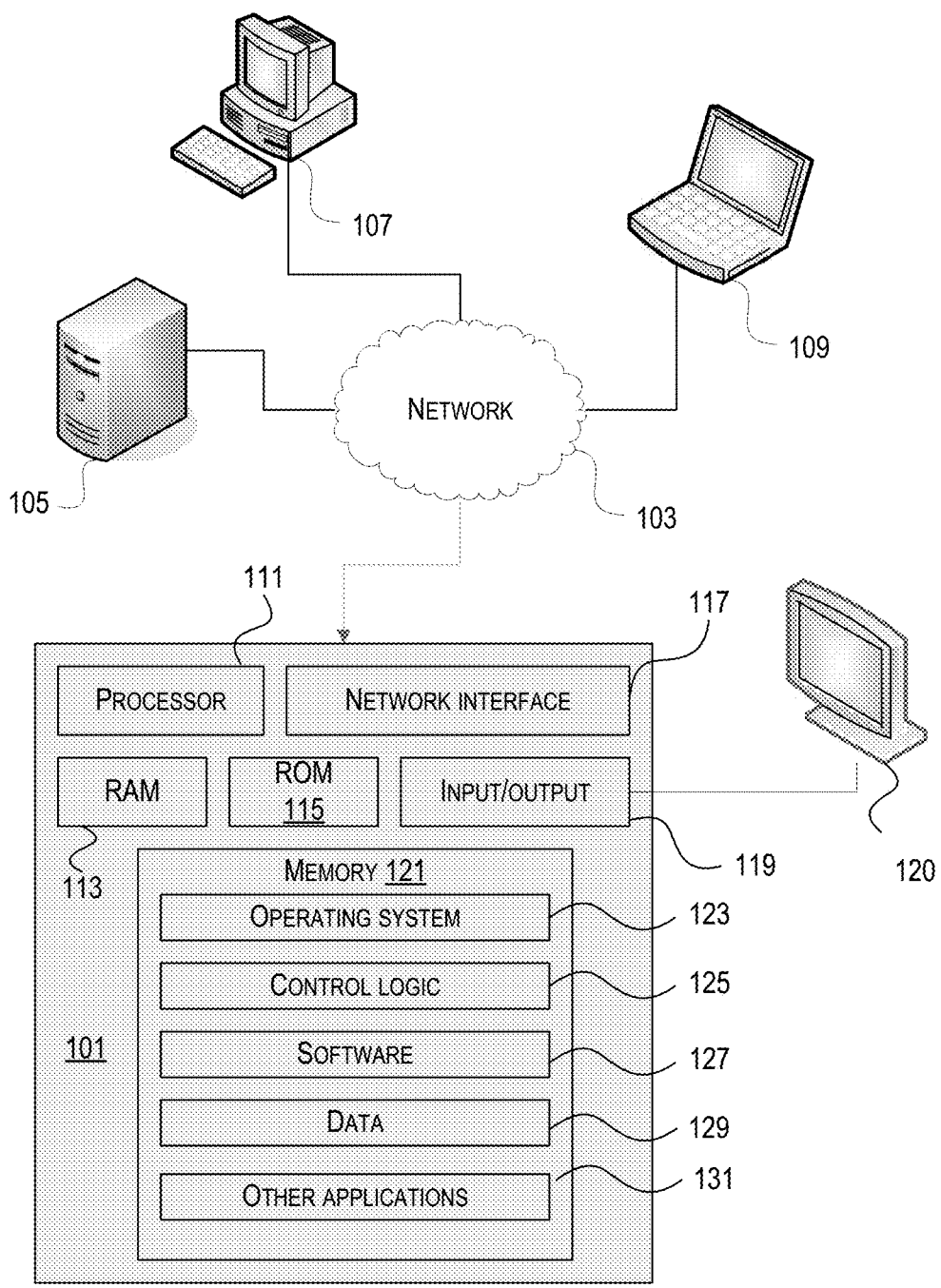
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127 (e.g., machine learning software), data 129 (e.g., training set), and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an example arrangement for determining a physical characteristic of a physical credential to authenticate the physical credential.

Figure 2A:
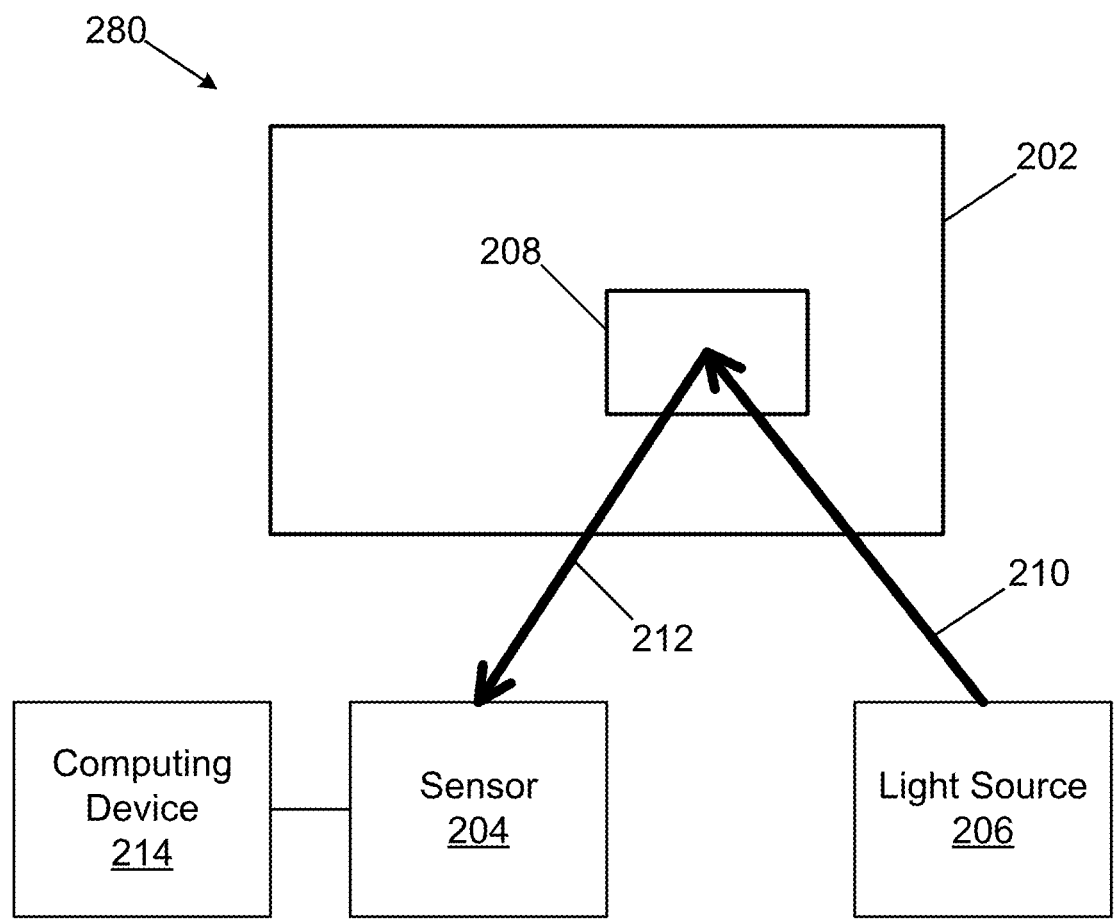
FIG. 2A depicts a physical credential in a first orientation for determining a physical characteristic of the physical credential according to one or more aspects of the disclosure.
Figure 2B:
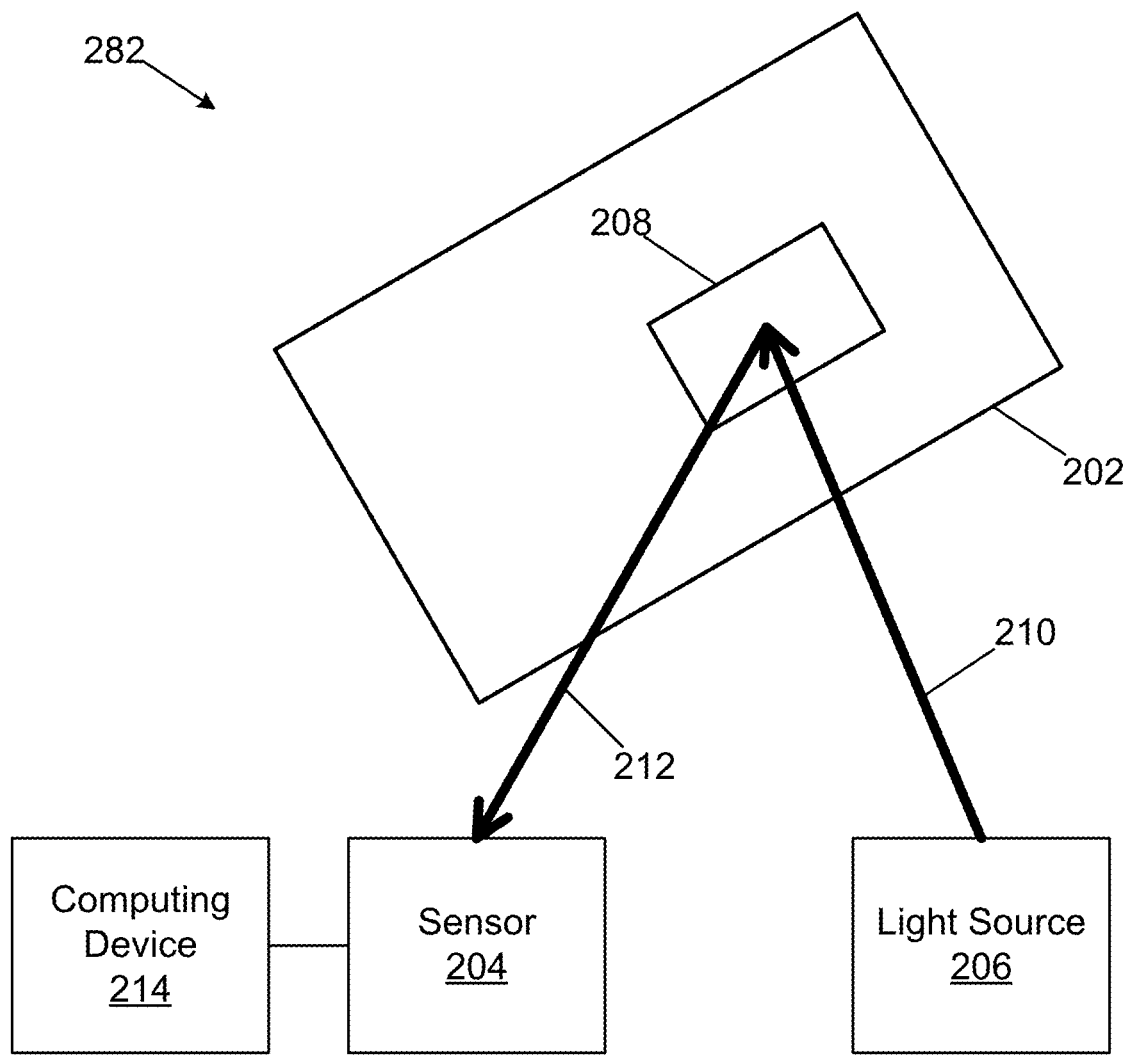
FIG. 2B depicts the physical credential in a second orientation for determining the physical characteristic of the physical credential according to one or more aspects of the disclosure.

FIGS. 2A and 2B illustrate an example arrangement for determining an authenticity of a physical credential 202 in accordance with one or more aspects described herein. FIG. 2A illustrates the physical credential 202 in a first orientation 280. FIG. 2B illustrates the physical credential 202 in a second orientation 282 (e.g., relative to the first orientation 280 of the physical credential 202). An orientation of the physical credential 202 may be relative to a sensor 204 and/or a light source 206 as discussed further herein. As an example, the orientation of the physical credential 202 may be relative to light reflected off of or from the physical credential 202 (or any portion thereof) such that light reflects off the physical credential 202 in a first manner in the first orientation 280 and reflects off of the physical credential 202 in a second manner in the second orientation 282.

In various embodiments, the physical credential 202 may be rotated in any manner (e.g., along any axis) in three-dimensional (3D) space. In various embodiments, the physical credential 202 may define a first plane when in the first orientation 280 and may define a second, different plane when in the second orientation 282. Alternatively, the physical credential 202 may be held stationary in both the first and second orientations 280 and 282 and one or more of the light source 206 and the sensor 204 may be moved relative to the physical credential 202 such that light incident on and/or reflected from the physical credential may vary between the first and second orientations 280 and 282.

The physical credential 202 may be any type of physical object or item including, for example, an identification (ID) card (e.g., a driver's license, a student ID, an employee ID, etc.), a document (e.g., a legal document, a notarized document, a passport, etc.), or a financial instrument (e.g., a personal check, a cashier's check, etc.). The sensor 204 may be any type of sensor such as, for example, an optical sensor and may be a component of an optical reader, camera, or video camera. The light source 206 may be any type of illumination source. In various embodiments, the sensor 204 and the light source 206 may be components of the same device (e.g., a smartphone, POS scanner/reader, etc.). In various embodiments the light source 206 may be a light source within an environment of the physical credential 202 and/or may represent an ambient lighting of the environment.

The physical credential 202 may include a secure feature or component 208. The secure feature 208 may be any type of physical feature or component. The secure feature 208 may be used to verify the authenticity of the physical credential 202. In various embodiments, the secure feature 208 may be positioned on a surface of the physical credential 202. In various embodiments, the secure feature 208 may be a watermark, a stamp, a seal, or a hologram. In various embodiments, the secure feature 208 may be any applied feature (e.g., printed, laser marked or etched, etc.) such as any graphical or textual feature including a picture. In various embodiments, the secure feature 208 may be or may include a covering of the physical credential 202 such as a layer of plastic or laminate covering all or any portion of the physical credential 202.

In various embodiments, as shown in FIGS. 2A and 2B, the light source 206 may provide an incident light ray or beam 210. A reflected light ray or beam 212 may be reflected off of the secure feature 208. The reflected light ray 212 may be received by the sensor 204. The sensor 204 may be coupled to a computing device 214. The computing device 214 may be any of the computing devices described herein and may represent an implementation of the computing device 101 depicted in FIG. 1. The reflected light ray 212 detected by the sensor 204 may be used by the computing device 214 to determine one or more physical characteristics of the secure feature 204 including, for example, an optical property of the secure feature 204 as described herein.

The light rays 210 and 212 may each be a single ray of light or may be a collection of a light rays. In general, the light rays 210 and 212 represent at least a portion of the light incident on the secure feature 208 and at least a portion of the light reflected from the secure feature 208, respectively. The light ray 212 may be considered to be light reflected from the secure feature 208 that is incident on and/or detected by the sensor 204 which may vary between the first and second orientations 280 and 282.

In various embodiments, the computing device 214 may be a smartphone (e.g., a smartphone that includes a camera/video camera and/or a light source). The smartphone may execute an application (app) that may implement the techniques and/or methods described herein for verifying an authenticity of the physical credential 202. In various embodiments, the computing device 214 may be a 3D scanner or reader (e.g., a point of sale (POS) scanner) that includes a camera/video camera and/or a light source. The 3D scanner may be capable of rotating around and/or about the physical credential 202.

In various embodiments, the sensor 204 and/or the computing device 214 may receive multiple images of the physical credential 202. The sensor 204 and/or the computing device 214 may receive multiple images of the physical credential 202 in various orientations. In various embodiments, the sensor 204 and/or the computing device 214 may receive at least a first image of the physical credential 202 in the first orientation 280 (e.g., as shown in FIG. 2A) and a second image of the physical credential 202 in the second orientation 282 (e.g., as shown in FIG. 2B). In various embodiments, the sensor 204 and/or the computing device 214 may receive a video sequence of the physical credential 202 in a variety of orientations, such that at least a first image of the physical credential 202 in the first orientation 280 and a second image of the physical credential 202 in the second orientation 282 are received. In various embodiments, more than one image of the physical credential 202 in a particular orientation may be received and used to determine an authenticity of the physical credential 202.

An orientation of the physical credential 202 may be varied by moving the physical credential 202 and/or by moving the sensor 204 and/or the light source 206. By changing the orientation of the physical credential 202—for example, from the first orientation 280 to the second orientation—light incident and reflected on the physical credential 202 (and/or the secure feature 208) may be varied. The light reflected differently from the physical credential 202 (and/or the secure feature 208) may be received by the sensor 204. As an example, the sensor 204 and/or the light source 206 may be held stationary and the physical credential 202 may be moved—for example, rotated, turned, shifted, etc. (e.g., by an individual holding the physical credential). As another example, the physical credential 202 may be held stationary and the sensor 204 and/or the light source 206 may be moved relative to the physical credential 202.

In general, a first orientation of the physical credential 202 corresponds to light reflecting from the physical credential 202 in a first manner (e.g., as detected/received by a sensor) and a second, different orientation of the physical credential 202 corresponds to light reflecting from the physical credential in a second, different manner (e.g., as detected/received by the sensor).

The computing device 214 may determine a type of the physical credential 202 based on at least one received image of the physical credential 202. In various embodiments, the computing device 214 may determine the type of the physical credential 202 based on one of the first received image or the second received image of the physical credential 202. As an example, the computing device 214 may determine that the physical credential 202 is a Virginia driver's license based on a received image of the physical credential 202 in the first orientation 280. In various embodiments, multiple images of the physical credential 202 may be used to determine the type of the physical credential 202. In various embodiments, the computing device 214 may determine the type of the physical credential 202 based a determined shape or size of the physical credential 202 and/or based on any determined feature included on the physical credential (e.g., any textual or graphical feature identifying the type of the physical credential 202).

Based on a determined type of the physical credential 202, the computing device 214 may determine one or more secure features associated with the physical credential 202 such as, for example, the secure feature 208. As an example, after determining that the physical credential 202 is a Virginia driver's license, the computing device 214 may determine that the physical credential 202 includes a secure feature 208 that is a hologram.

Light reflected off of the secure feature 208 (e.g., the reflected ray 212) may be used to determine a physical property of the secure feature 208 (and/or the physical credential 202) such as, for example and as discussed above, an optical characteristic of the secure feature 208. In various embodiments, the optical characteristic of the secure feature 208 may be determined based on the reflected light in two or more images of the physical credential 202 and/or the secure feature 208 in two or more orientations including, for example, a video sequence of the physical credential 202 and/or the secure feature 208 in a variety of orientations. Based on the reflected light in two or more images, more reliable and more accurate determinations of one or more optical characteristics of the secure feature 208 may be determined, thereby improving detection of authentic physical credentials and inauthentic physical credentials.

The optical characteristics of the secure feature 208 that may be determined may include, for example, color, refractive index, transparency, an intensity of reflected light, a scattering of light, or a movement of a glare reflected by the secure feature 208. As an example, the secure feature 208 may be a laminate covering the physical credential 202. The light reflected off of the laminate secure feature 208 (e.g., the reflect light ray 212) may be used to determine the refractive index of the laminate secure feature 208 and/or a transparency of the laminate secure feature 208.

As another example, a glare of the light reflected off of the laminate secure feature 208 (e.g., the reflected light ray 212) may be detected. In various embodiments, a movement of the glare between the first and second images may be determined. In various embodiments, a change in a size of the glare between the first and second images may be determined.

As a further example, a color of light reflected off of the secure feature 202, a scattering of light reflected off of the secure feature 208, and/or an intensity of light reflected off of the secure feature 208—or a change in any of these optical properties—may be determined.

In various embodiments, any determined physical and/or optical characteristic of the secure feature 208 may be compared to a corresponding expected physical and/or optical characteristic of the secure feature 208. In various embodiments, based on the determined type of the physical credential 202, known properties of the secure feature 208 may be determined. Based on the known properties of the secure feature 208 and/or the first and second orientations 280 and 282 of the physical credential 202, the computing device 214 may determine the expected physical and/or optical characteristic of the secure feature 208. In various embodiments, the computing device 214 may determine the first and second orientations 280 and 282 of the physical credential 202 based on the first and second images of the physical credential 202. In various embodiments, the expected physical and/or optical characteristic of the secure feature 208 may also be determined based on a lighting level of the environment of the physical credential 202.

In general, the computing device 214 may use the changing light reflected off of the secure feature 208—from different orientations of the secure feature 208—to measure and/or detect an optical characteristic of the secure feature 208. The computing device 214 may also use known information regarding the secure feature 208 and the physical credential 202 (e.g., the lighting of the physical credential 202, the orientation of the physical credential 202, etc.). The computing device 214 may then compare the determined optical characteristic of the secure feature 208 to the expected optical characteristic of the secure feature 208 to determine if the physical credential 202 is authentic.

For example, if the determined optical characteristic of the secure feature 208 matches the expected optical characteristic of the secure feature 208, then the computing device 214 may decide the physical credential 202 is authentic. If the determined optical characteristic of the secure feature 208 does not match the expected optical characteristic of the secure feature 208, then the computing device 214 may decide the physical credential 202 is inauthentic.

In various embodiments, the computing device may determine a first value (e.g., based on a determined metric) indicating the determined optical characteristic of the secure feature 208 and may determine a second value (e.g., based on the determined metric) indicating the expected optical characteristic of the secure feature 208. The first and second values may be compared. If the first value is within a predetermined range of the second value, the computing device 214 may decide the physical credential 202 is authentic. If the first value is outside of the predetermined range of the second value, the computing device 214 may decide the physical credential 202 is inauthentic.

In various embodiments, one or more additional features of the physical credential 202 may be detected and/or measured to contribute to any determination whether the physical credential 202 is authentic or inauthentic. In various embodiments, a shape, size, and/or thickness of the physical credential 202 may be determined and may be used to determine an authenticity of the physical credential. Any feature on the physical credential 202—such as any graphical, textual, or pictorial features—may also be used to determine an authenticity of the physical credential. In various embodiments, authentication may be based on a presence of such features and/or confirmation that any such feature matches an expected characteristic (e.g., if a watermark included on the physical credential 202 matches an expected design).

In various embodiments, machine learning may be used to facilitate authentication of a physical credential. In various embodiments, authentic and inauthentic physical credentials may be used to train a system that may use machine learning to apply training data to detection of authentic and inauthentic physical credentials.

In various embodiments, the computing device 214 may operate in conjunction with one or more computing devices including any local or remote computing device to perform any of the operations described herein. In various embodiments, information regarding known properties of secure features may be stored by a remote computing device that the computing device 214 interacts with to obtain such information or any information derived therefrom.

Figure 3:
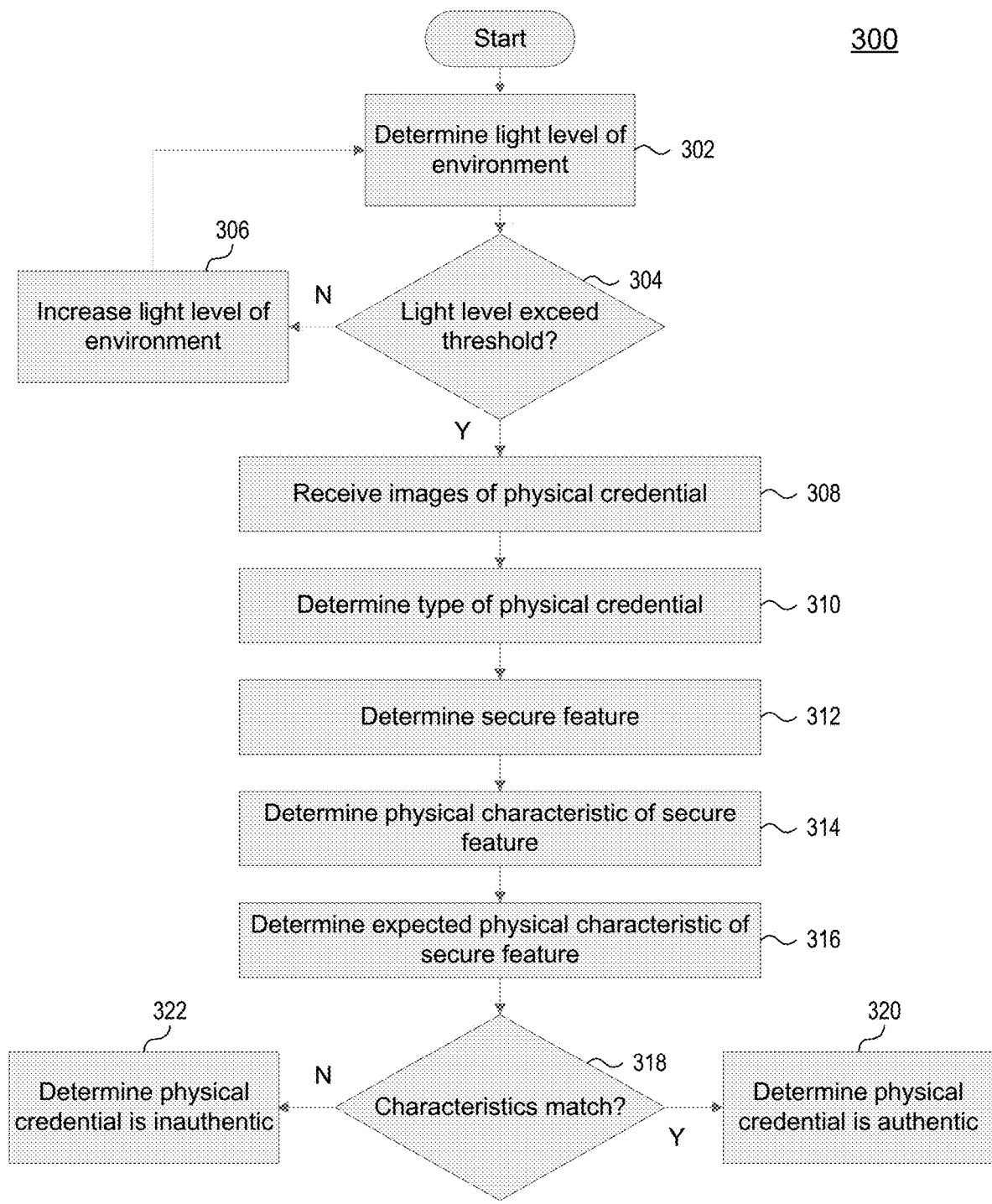
FIG. 3 depicts a flow chart for a method of determining an authenticity of a physical credential based on determining a physical characteristic of the physical credential according to one or more aspects of the disclosure.

Having discussed an example arrangement for determining an authenticity of a physical credential, discussion will now turn to an illustrative method for determining an authenticity of a physical credential FIG. 3 illustrates an example method 300 for determining a physical characteristic of a physical credential (e.g., the physical credential 202) in accordance with one or more aspects described herein. Method 300 may be implemented based on the example arrangement depicted in FIGS. 2A and 2B. Method 300 may be implemented by a suitable computing system, as described herein. For example, method 300 may be implemented in any suitable computing environment by a computing device and/or combination of computing devices, such as computing devices 101, 105, 107, and 109 of FIG. 1 and/or computing device 214 of FIGS. 2A and 2B. Method 300 may be implemented in suitable program instructions, such as in software 127, and may operate on data, such as data 129.

At step 302, a light level of an environment of the physical credential may be determined. The physical credential may be in any environment such as inside any physical space or may be outside in an open or non-enclosed area. The environment of the physical credential may be illuminated by any light source including natural light and/or artificial light. The light level of the environment may be determined by ambient light of the environment. A sensor may be used to determine the light level of the environment by, for example, determining an intensity of light received by a sensor.

At step 304, the determined light level of the environment of the physical credential may be compared to a light level threshold. The light level threshold may represent a minimum intensity of light for receiving images of the physical credential. If the determined light level of the environment is lower than the light level threshold, then at step 306 an action to increase the light level of the environment may occur. In various embodiments, at step 306, a supplemental light source may be automatically activated that may be used to illuminate the physical credential. For example, a light source on a computing device (e.g., a smartphone, a 3D reader/scanner) may be automatically turned on. In various embodiments, at step 306, a request may be issued to a user to increase an illumination of the physical credential (e.g., a request to hold the physical credential under a light, to turn a light on, or to move the physical credential to a space with a higher light level). As an example, a notification may be issued to the user that the determined light level is insufficient and that the light level of the environment is to be increased. If the determined light level of the environment is higher than the light level threshold, then the method 300 may proceed to step 308.

At step 308, multiple images of the physical credential may be received. In various embodiments, a video sequence of the physical credential may be received. The video sequence may include multiple images of the physical credential. In various embodiments, two or more images of the physical credential may be received. In various embodiments, each received image may correspond to a different orientation of the physical credential. In various embodiments, multiple images of the physical credential in the same orientation may be received provided at least one additional image of the physical credential in a different orientation is received.

The orientation of the physical credential may be changed by moving the physical credential (e.g., by a user holding the physical credential moving the physical credential or holding the physical credential differently). The orientation of the physical credential may be relative to a light source associated with the physical credential or a sensor (e.g., an optical sensor) receiving the images of the physical credential such that moving one or more of the physical credential, the sensor, and/or the light source changes the relative orientation of the physical credential.

The images of the physical credential may be received by any type of sensor including a camera or video camera. In various embodiments, the sensor may be rotated or moved relative to the physical credential when the physical credential is held in a stationary position to receive the multiple images and/or video sequence of the physical credential.

In various embodiments, the received images and/or video sequence of the physical credential may be stored in a memory of a computing device. In various embodiments, at least a first image of the physical credential in a first orientation is received and a second image of the physical credential in a second orientation is received.

At step 310, a type of the physical credential may be determined. The type of the physical credential may be determined based on at least one received image of the physical credential. The type of the physical credential may be determined based on one or more physical features or components of the physical credential including the shape and size of the physical credential or any feature applied to the physical credential (e.g., any textual, graphical, pictorial feature or markings including watermarks, stamps, seals, etc.).

The physical credential may be any type of physical credential as described herein including, for example, an ID card, a document, or a financial instrument. A database or other memory (e.g., either remote or local to the physical credential) may be used to determine the type of the physical credential. In various embodiments, a local or remote database or memory component may store information regarding various characteristics and features of various physical credentials. The stored known characteristics of various physical credentials may be consulted to determine a specific type of the physical credential in the at least one received image of the physical credential.

At step 312, a secure feature or component of the physical credential may be determined (e.g., the secure feature 208). The secure feature may be determined based on the determined type of the physical credential. The secure feature may be a physical feature of the physical credential. The secure feature may be any type of secure feature as described herein including, for example, a hologram, a layer of plastic covering all or a portion of the physical credential, a stamp, a watermark, a graphical image, a textual image, or a photographic image.

A database or other memory (e.g., either remote or local to the physical credential) may be used to determine the secure feature of the physical credential. In various embodiments, a local or remote database or memory component may store information regarding various secure features for various specific physical credentials. The stored known secure features of various physical credentials may be consulted to determine a specific secure feature of the determined physical credential.

At step 314, a physical characteristic of the secure feature may be determined. The physical feature of the secure feature may be any physical feature including, for example, an optical characteristic of the secure feature. The optical characteristic of the secure feature may be determined based on the light reflected from the secure feature in multiple images of the physical credential in multiple orientations. In various embodiments, the optical characteristic of the secure feature may be determined based on light reflected from the secure feature in a first received image of the physical credential in a first orientation and a second received image of the physical credential in a second, different orientation.

In various embodiments, the light reflected from the secure feature changes or varies between the first received image of the physical credential and the second received image of the physical credential. The optical characteristic of the secure feature may be more reliably determined based on the different manner the light reflects from the secure feature in the first and second images (e.g., including based on the change in the light reflected from the secure feature) in comparison to determining an optical characteristic of the secure feature based on only a single received image of the physical credential.

As described herein, the optical characteristic of the secure feature may be any type of optical characteristic including, for example, a color of the secure feature, a refractive index of the secure feature, an intensity of light reflected from the secure feature, a scattering of light reflected by the secure feature, or a change in any of these optical characteristics between the first and second images of the physical credential. In various embodiments, the optical characteristic may include the behavior of a glare of light reflected from the secure feature such as a movement of the glare, a size of the glare, and/or a change in the size of the glare between the first and second images of the physical credential.

In various embodiments, one or more sensors may be used to detect one or more features of the light reflected from the secure feature to determine any of the optical characteristics of the secure feature described herein. The features of the light then may be used (e.g., processed by a computing device) to determine one or more optical characteristics of the secure feature. Processing of any information or data collected regarding the light reflected from the secure feature may be conducted local to or remotely from the secure feature (e.g., by a remote computing device, a local computing device, or any combination thereof).

At step 316, an expected physical characteristic of the secure feature may be determined. The expected physical characteristic of the secure feature may be any physical feature including, for example, an optical characteristic of the secure feature. The expected physical characteristic of the secure feature may correspond to the determined physical characteristic of the secure feature determined at step 314. For example, if a detected movement of glare of light reflected from the secure feature is determined at step 314, then at step 316, an expected movement of glare of light reflected from the secure feature may be determined.

The expected optical characteristic of the secure feature may be determined based on known physical properties or characteristics of the secure feature. A database or other memory (e.g., either remote or local to the physical credential) may be used to determine the known properties of the secure feature. In various embodiments, a local or remote database or memory component may store information regarding various properties of specific secure features. The stored known properties of the secure features may be consulted to determine a specific property of the secure feature. Example properties of the secure feature may include a shape, a size, a color, a placement, or an orientation of the secure feature as well as information regarding materials forming the secure feature or any materials or coatings covering the secure feature.

The expected optical characteristic of the secure feature may be determined based on the first orientation of the physical credential (e.g., corresponding to the first received image of the physical credential) and the second orientation of the physical credential (e.g., corresponding to the second received image of the physical credential). The first and second orientations of the physical credential may be determined based on information provided by the first and second received images of physical credential. For example, one or more image processing techniques may be used to determine the first and second orientations. In various embodiments, a sensor may detect an orientation of a device receiving the first and second images of the physical credential which may be used to determine the first and second orientations of the physical credential.

The expected optical characteristic of the secure feature may also be based on a determined light level of the environment of the credential. In various embodiments, a sensor may detect an illumination level of the physical credential—for example, an intensity of light incident and/or reflected by the physical credential and/or an ambient lighting level of the environment of the physical credential.

At step 318, the physical characteristic of the secure feature determined at step 314 may be compared to the expected physical characteristic of the secure feature determined at step 316. In various embodiments, a first value indicative of the physical characteristic of the secure feature determined at step 314 may be determined and a second value indicative of the expected physical characteristic of the secure feature determined at step 316 may be determined. The first value may be compared to the second value.

If the physical characteristic of the secure feature determined at step 314 matches the expected physical characteristic of the secure feature determined at step 316, then at step 320, the physical credential may be determined to be authentic. In various embodiments, the physical characteristic of the secure feature may be considered to match the expected physical characteristic of the secure feature when the first value is within a predetermined range of the second value. The predetermined range may be determined in any manner and may vary based on the type of the physical credential and/or the type of the secure feature.

If the physical characteristic of the secure feature determined at step 314 does not match the expected physical characteristic of the secure feature determined at step 316, then at step 322, the physical credential may be determined to be inauthentic. In various embodiments, the physical characteristic of the secure feature may be considered to not match the expected physical characteristic of the secure feature when the first value is outside of the predetermined range of the second value.

At step 322, additional actions may be taken when it is determined that the physical credential is inauthentic. In various embodiments, the method 300 may be repeated in an attempt to authenticate the physical credential. Whether the method 300 is repeated may depend upon a number of consecutive determinations that the physical credential is inauthentic based on the method 300. In various embodiments, at step 322, a notification regarding the determination that the physical credential is inauthentic may be generated. The generated notification may be sent to one or more parties and/or one or more computing devices. In various embodiments, at step 322, use of the physical credential may be deactivated and/or any authorization associated with the physical credential may be revoked by, for example, storing and/or sending information indicating the same.

Some aspects described herein may provide benefits for determining an authenticity of a physical credential in a more reliable and accurate manner A physical characteristic of the physical credential, or any portion thereof including a secure feature of the physical credential, may be more accurately and more reliably determined based on using two or more images of the physical credential in two or more corresponding orientations. The more accurately determined physical characteristic may then be used to determine authenticity, thereby improving the reliability of the results of any authentication determination. Aspects described herein are less susceptible to inauthentic photocopies or digital representations of physical credentials. For example, a glare of reflected light off of a photocopy will behave differently than off of an authentic physical credential, and may be detected by the aspects described herein. The glare size and movement may be predictable based on the aspects described herein and may be compared to glare from a photocopy to determine the photocopy is an inauthentic physical credential.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
  receiving a first image of a credential in a first orientation;
  receiving a second image of the credential in a second orientation;
  determining a type of the credential based on at least one of the first image and the second image;
  determining a secure feature of the credential based on the determined type of the credential;
  determining an optical characteristic of the secure feature based on light reflected from the secure feature in both the first image and the second image;
  determining an expected optical characteristic of the secure feature based on known properties of the secure feature, the first orientation, and the second orientation; and
  determining the credential is authentic when the determined optical characteristic of the secure feature matches the expected optical characteristic of the secure feature, otherwise determining the credential is inauthentic,
  wherein determining the optical characteristic of the secure feature comprises determining a movement of a glare of the light reflected from the secure feature.

2. The method of claim 1, further comprising:
  determining a light level of an environment of the credential;
  comparing the determined light level to a light level threshold; and
  activating a light source to illuminate the credential when the determined light level is less than the light level threshold.

3. The method of claim 1, wherein the secure feature comprises a hologram.

4. The method of claim 1, wherein the secure feature comprises a layer of plastic covering the credential.

5. The method of claim 1, wherein the secure feature comprises a stamp.

6. The method of claim 1, wherein the secure feature comprises a watermark.

7. The method of claim 1, wherein the secure feature comprises at least one of a graphical image, a photographic image, and a textual image.

8. The method of claim 1, wherein determining the optical characteristic of the secure feature comprises determining a color of the secure feature.

9. The method of claim 1, wherein determining the optical characteristic of the secure feature comprises determining a refractive index of the secure feature.

10. The method of claim 1, wherein determining the optical characteristic of the secure feature comprises determining an intensity of the light reflected from the secure feature.

11. The method of claim 1, wherein determining the optical characteristic of the secure feature comprises determining a scattering of the light reflected from the secure feature.

12. The method of claim 1, further comprising determining the expected optical characteristic of the secure feature based on a determined light level of an environment of the credential.

13. The method of claim 1, wherein the determined optical characteristic of the secure feature matches the expected optical characteristic of the secure feature when a value indicative of the determined optical characteristic is within a predetermined range of a value indicative of the expected optical characteristic.

14. The method of claim 1, wherein the credential is an identification (ID) card.

15. The method of claim 1, wherein the credential is a document.

16. A system comprising:
  a database configured to store known physical characteristics of a secure feature of a credential;
  one or more processors; and
  memory storing instructions that, when executed by the one or more processors, cause the system to:
    receive a video sequence of the credential in two or more orientations;
    determine a type of the credential based on the video sequence;
    determine the secure feature of the credential based on the determined type of the credential;
    determine a value indicating a physical characteristic of the secure feature based on light reflected from the secure feature in the video sequence;
    determine an expected value indicating the physical characteristic of the secure feature based on the known physical characteristics of the secure feature, a light level of an environment of the credential, and the two or more orientations;
    compare the determined value and the determined expected value; and
    determine the credential is authentic when the determined value is within a predetermined range of the determined expected value, otherwise determining the credential is inauthentic.

17. The system of claim 16, wherein the physical characteristic comprises a refractive index of the secure feature.

18. The system of claim 16, wherein the physical characteristic comprises a luminance of the secure feature.

19. One or more non-transitory media storing instructions that, when executed by one or more processors, cause the one or more processors to perform steps comprising:
receiving a plurality of images of a credential in a plurality of orientations;
determining a type of the credential based on the plurality of images;
determining a size and a movement of a glare reflected off of the credential in the plurality of images;
determining an expected size and an expected movement of the glare based on known physical properties of a layer of plastic covering the credential, the plurality of orientations, and a light level of an environment of the credential; and
determining the credential is authentic when the determined size and the determined movement of the glare match the determined expected size and the determined expected movement of the glare, respectively, otherwise determining the credential is inauthentic.

* * * * *